Patented June 15, 1954

2,681,364

UNITED STATES PATENT OFFICE 2,681,364

PROCESS FOR THE PRODUCTION OF 1-p-NITROPHENYL - 2 - ACYLAMIDOPROPANE-1,3-DIOLS

Loren M. Long, Grosse Pointe Woods, and George W. Moersch, Detroit, Mich., assignors to Parke, Davis & Company, Detroit, Mich., a corporation of Michigan No Drawing. Application October 27, 1951, Serial No. 253,568

9 Claims. (Cl. 260—558)

This invention relates to a process for the production of 1-p-nitrophenyl-2-acylamidopropane-1,3-diols having the formula,

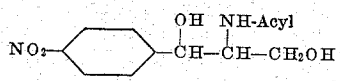

wherein Acyl represents a carboxylic acid acyl radical such as a lower aliphatic acyl, halogen substituted lower aliphatic acyl, benzoyl, ether substituted lower aliphatic acyl, hydroxyl substituted lower aliphatic acyl, benzoyl, substituted with non-reducible groups such as halogen, alkoxy, alkyl and hydroxyl groups, araliphatic acyl and the like radicals.

It will be appreciated by those skilled in the art that the 1-p-nitrophenyl - 2-acylamidopropane-1,3-diol products depicted above can exist in structural or diastereoisomeric as well as optical isomeric form. For convenience, the cis diastereoisomers will be referred to as having the "regular" structural form while the trans diastereoisomers will be referred to as having the "pseudo" structural form. The terms "regular" and "pseudo" are synonymous with the designations "erythro" and "threo" which have also been used to describe the diastereoisomeric character of this type of product.

Because of the difficulty of representing the structural differences in the products produced by the process of the instant invention by graphic formulae, the customary structural formulae will be used in both the specification and claims and a notation placed below the formula to designate the particular structural and optical configuration of the compound. Where no notation appears, the formula is to be interpreted in its generic sense, that is, as representing the individual structural and optical isomers as well as the total unresolved mixture of structural and optical isomers. Such a formula does not merely represent the unresolved mixture of isomers.

In accordance with the invention, 1-p-nitrophenyl - 2-acylamidopropane-1,3-diol compounds having the above formula are produced by the action of sodium or potassium borohydride on an α-acylamido-β-hydroxy - p - nitropropiophenone compound of formula,

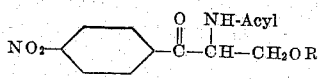

where R is hydrogen or a carboxylic acid acyl radical. In carrying out the process a hydroxylic solvent such as water, lower aliphatic alcohols or aqueous solutions of aliphatic alcohols are used. Some of the solvents which have been found to be suitable are water, methanol, ethanol, isopropanol, aqueous methanol, aqueous ethanol, aqueous isopropanol and the like.

The temperature during the reaction is kept below 50° C. When an aqueous solvent is employed, best results are obtained by keeping the temperature of the reaction medium below about 15° C. in order to minimize the decomposition of the alkali metal borohydride due to interaction with the solvent. Where an anhydrous solvent is employed, this difficulty is not encountered and considerably higher temperatures can be used with a given quantity of reducing agent. For example, when using anhydrous ethanol as the solvent, the process can be carried out even at 25 to 40° C. with very little destruction of the reductant due to reaction with the solvent.

The quantity of the sodium and potassium borohydrides in relationship to the quantity of the ketonic compound used in the process is capable of quite wide variation because an excess of the reductant does not appear to have much influence on the yield of the final product. In general, anywhere from one to ten equivalents of the reductant can be employed, although in practice it has been found to be more economical to use between about 1.5 to 3 equivalents for each equivalent of the ketonic compound. In this connection, it should be noted that it is not necessary to use any greater quantity of the reducing agent when using a β-acyloxy ketonic compound as the starting material than that used with the β-hydroxy ketonic starting materials. The exact mechanism by which the acyloxy group is removed during the process is not known but it probably involves an ester interchange reaction with the solvent rather than a reductive removal. The nature of this postulated "ester interchange reaction" is probably quite complex because the use of the β-acyloxy ketonic starting materials seems to favor the formation of the regular diastereoisomeric form of the 1-p-nitrophenyl-2-acylamidopropane-1,3-diol almost to the exclusion of the pseudo isomer, while the use of the β-hydroxy ketonic compounds as starting materials results in more or less an equal mixture of the two diastereoisomeric forms of the acylamido diol product.

After the reduction phase of the process has been completed, the product exists in the form of a boron complex which must be hydrolyzed to liberate the free 1-p-nitrophenyl-2-acylamidopropane-1,3-diol. This hydrolysis can be brought about by adding water to the reaction mixture and warming in the cases where an anhydrous medium has been used. Of course, where an aqueous reaction medium has been employed, it is only necessary to warm the reaction mixture. However, the preferred method of hydrolyzing the complex is to use a dilute acid rather than heat. Some of the acids which can be used for this purpose are the mineral acids such as hydrochloric, hydrobromic and sulfuric acid and the common organic acids such as acetic acid. In addition to hydrolyzing the boron complex, any excess of the alkali metal borohydride which is present in the reaction mixture is also decomposed by the hydrolytic treatment.

The products produced by the process of the invention find particular use as antibiotics or as intermediates in the production of other organic compounds possessing such therapeutic activity.

The invention is illustrated by the following examples.

Example 1

0.4 g. of sodium borohydride in 25 cc. of absolute ethanol is added to a solution of 2.52 g. of α-acetamido-β-hydroxy-p-nitropropiophenone in 25 cc. of absolute ethanol and the clear, yellow reaction mixture allowed to stand at room temperature for one hour. The reaction mixture is made acid by the addition of 5 N hydrochloric acid and the insoluble boron salts removed by filtration. The dark yellow solution is evaporated to a syrup and the residue stirred with petroleum ether to give 2 g. of a solid product melting at 162–180° C. This product which is a mixture of (dl)-reg.-1-p-nitrophenyl - 2 - acetamidopropane - 1,3 - diol and (dl)-φ-1-p-nitrophenyl-2-acetamidopropane-1,3-diol is separated into its components by recrystallization from ethyl acetate and/or from ethanol. The yield of the (dl)-φ-1-p-nitrophenyl - 2 - acetamidopropane-1,3-diol (M. P. 165° C.) is 0.64 g. (25%) and the yield of the (dl)-reg. isomer (M. P. 195–6° C.) is 1.2 g. (47%).

Example 2

29.4 g. of α-acetamido-β-acetoxy-p-nitropropiophenone is added portion-wise with stirring over a period of ten minutes to a solution of 3.78 g. of sodium borohydride dissolved in 300 cc. of absolute ethanol. The orange-yellow solution is stirred for about two hours during most of which time the temperature remains at 40° C. The solution is cooled to 10° C. and made slightly acid with hydrochloric acid. The acidic solution is concentrated to a volume of about 50 cc., cooled in an ice bath and the solid which precipitates is collected. This material (12 g., or 47.6%) consists of crude (dl)-reg.-1-p-nitrophenyl-2-acetamidopropane-1,3-diol which melts at 185–90° C. Recrystallization of the product from ethyl acetate and alcohol raises the melting point to 195–6° C.

Example 3

(a) 0.4 g. of sodium borohydride in 25 cc. of absolute ethanol is added to a solution of 3.21 g. of α-dichloroacetamido-β-hydroxy - p - nitropropiophenone in 25 cc. of absolute ethanol and the resulting solution allowed to stand at room temperature for one hour. The reaction mixture is made slightly acid with 5 N hydrochloric acid and the solution filtered. The filtrate is evaporated to dryness and the yellow gummy residue taken up in and crystallized several times from ethylene dichloride. In this manner 1.25 g. (39%) of (dl)-φ-1-p-nitrophenyl - 2 - dichloroacetamidopropane-1,3-diol (M. P. 151° C.) and 0.2 g. (6%) of (dl)-reg.-1-p-nitrophenyl - 2 - dichloroacetamidopropane-1,3-diol (M. P. 173° C.) are obtained. Reworking the mother liquors from the crystallizations yields another 21% of crude (dl)-reg.-1-p-nitrophenyl - 2 - dichloroacetamidopropane-1,3-diol.

(b) 5.4 g. of potassium borohydride dissolved in the minimal amount of ice water is added slowly with stirring to a solution of 32.1 g. of α - dichloroacetamido-β-hydroxy-p-nitropropiophenone in 350 cc. of methanol keeping the temperature at about 0° C. After the addition has been completed, the reaction mixture is allowed to stand for two hours and then acidified with dilute hydrochloric acid. The mixture is neutralized and the methanol distilled in vacuo. The aqueous residue is extracted with ethyl acetate. The combined ethyl acetate extracts are dried and the ethyl acetate distilled to obtain a residue consisting of a mixture of (dl)-φ-1-p-nitrophenyl - 2 - dichloroacetamidopropane-1,3-diol and (dl)-reg.-1-p-nitrophenyl - 2 - dichloroacetamidopropane-1,3-diol. The residue is washed with several small portions of ethyl acetate and the ethyl acetate extracts retained for further purification. The ethyl acetate insoluble residue is recrystallized from water to obtain the desired (dl)-φ-1-p-nitrophenyl - 2 - dichloroacetamidopropane-1,3-diol (M. P. 151° C.) in pure form. The aqueous mother liquors are concentrated, allowed to stand for several days and the crystalline (dl)-reg.-1-p-nitrophenyl - 2 - dichloroacetamidopropane-1,3-diol (M. P. 173° C.) which separates collected.

The ethyl acetate extracts are evaporated to dryness and the residue separated into its components by recrystallization from water as described above. The yield of the (dl)-φ-1-p-nitrophenyl - 2 - dichloroacetamidopropane-1,3-diol is about 35% and the yield of the (dl)-regular isomer is about 23%.

Example 4

36.3 g. of α-dichloroacetamido-β-acetoxy-p-nitropropiophenone is added over a period of ten minutes with stirring to 3.78 g. of sodium borohydride dissolved in 300 cc. of ethanol and the reaction mixture stirred for about two hours. After the temperature of the reaction drops to about 30° C. (temperature about 40° C. during reaction period), the solution is acidified with 5 N hydrochloric acid and filtered. The filtrate is evaporated to dryness in vacuo and the residue taken up in and crystallized from ethanol to obtain the desired (dl)-reg.-1-p-nitrophenyl-2-dichloroacetamidopropane-1,3-diol (M. P. 173° C.); yield, about 40–45%.

This same product is produced when 33.2 g. of α - dichloroacetamido - β - dichloroacetoxy - p - nitro-propiophenone is substituted for the α-dichloroacetamido - β - acetoxy - p - nitropropiophenone employed above.

Example 5

3.78 g. of sodium borohydride dissolved in 150 cc. of ethanol is added slowly to an ethanol solution containing 31.4 g. of α-benzamido-β-hydroxy-p-nitropropiophenone and the resulting mixture stirred at room temperature for about two hours. The reaction mixture is acidified with hydrochloric acid, filtered and the filtrate evaporated to dryness in vacuo. The residue which consists of a mixture of (dl)-ψ-1-p-nitrophenyl-2-benzamidopropane-1,3-diol and (dl)-reg. - 1 - p-nitrophenyl - 2 - benzamidopropane- 1,3-diol is separated into its components by several recrystallizations from ethyl acetate mixture from which the (dl)-ψ isomer separates first. The yield of the (dl)-ψ isomer (M. P. 158°–9° C.) is about 32%, while that of the (dl)-reg. isomer (M. P. 211–12° C.) is about 41%.

Similar results are obtained when substituted benzamido ketones such as α-(p'-methyl benzamido) - β - hydroxy - p - nitropropiophenone, α - (m' - methoxybenzamido) - β - hydroxy - p - nitropropiophenone and α-(p'-bromobenzamido)-β-hydroxy-p-nitropropiophenone are employed as the starting materials. Of course, in these instances the products differ from those produced above in that they have a substituent in the 2-benzamido group.

*Example 6*

28.2 g. of finely divided α-methoxyacetamido-β-hydroxy-p-nitropropiophenone is added slowly with stirring to 3.78 g. of sodium borohydride dissolved in 300 cc. of ethanol, keeping the temperature at about 35° C. The reaction mixture is stirred for two hours, acidified with dilute hydrochloric acid and filtered. The filtrate is evaporated to dryness in vacuo and the residue separated into its component (dl)-ψ and (dl)-reg. - 1 - p - nitrophenyl - 2 - methoxyacetamidopropane-1,3-diols by crystallizations from ethyl acetate or water. The yield of the (dl)-ψ isomer (M. P. 141–2° C.) is about 33%, while that of the (dl)-reg. isomer is about 28%.

*Example 7*

2.9 g. of sodium borohydride in 200 cc. of ethanol is added slowly with stirring to an ethanol solution containing 16.4 g. of α-phenylacetamido-β-hydroxy-p-nitroacetophenone and the resulting mixture stirred at room temperature for two hours. The solution is acidified with dilute hydrochloric acid, filtered and the filtrate evaporated to dryness. The residue is taken up in and crystallized several times from aqueous ethanol to obtain the desired (dl)-ψ-1-p-nitrophenyl-2-phenylacetamidopropane-1,3-diol and (dl) - reg. - 1 - p - nitrophenyl - 2 - phenylacetamidopropane-1,3-diol in pure form. The yield of the (dl)-ψ isomer is about 28%, while that of the (dl)-reg. isomer is about 24%.

What we claim is:

1. Process which comprises reacting an α-acylamido-p-nitropropiophenone compound of formula,

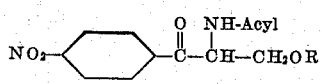

with a reducing agent of the class consisting of sodium borohydride and potassium borohydride in a hydroxylic solvent and hydrolyzing the boron complex so formed thereby obtaining a 1-p-nitrophenyl-2-acylamidopropane-1,3-diol compound of formula,

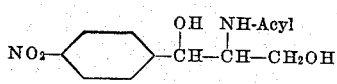

where Acyl is a carboxylic acid acyl group, and R is a member of the class consisting of hydrogen and carboxylic acid acyl radicals.

2. Process which comprises reacting an α-acylamido - β - hydroxy - p - nitropropiophenone compound of formula,

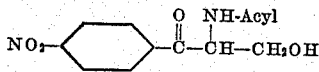

with a reducing agent of the class consisting of sodium borohydride and potassium borohydride in a hydroxylic solvent selected from the class consisting of water, lower aliphatic alcohol and aqueous lower aliphatic alcohol at a temperature below 50° C. and hydrolyzing the boron complex so formed thereby obtaining a 1-p-nitrophenyl - 2 - acylamidopropane - 1,3 - diol compound of formula,

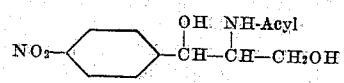

where Acyl is a carboxylic acid acyl group.

3. Process which comprises reacting α-dichloroacetamido-β-hydroxy - p - nitropropiophenone with sodium borohydride in a hydroxylic solvent selected from the class consisting of water, lower aliphatic alcohol and aqueous lower aliphatic alcohol at a temperature below 50° C. and hydrolyzing the boron complex so formed thereby obtaining a 1-p-nitrophenyl - 2 - dichloroacetamidopropane-1,3-diol compound of formula,

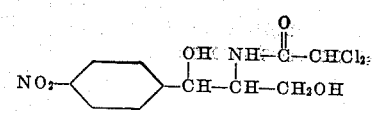

4. Process which comprises reacting α-acetamido-β-hydroxy-p-nitropropiophenone with sodium borohydride in a hydroxylic solvent selected from the class consisting of water, lower aliphatic alcohol and aqueous lower aliphatic alcohol at a temperature below 50° C. and hydrolyzing the boron complex so formed thereby obtaining a 1-p-nitrophenyl - 2 - acetamidopropane-1,3 - diol compound of formula,

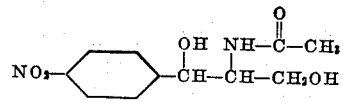

5. Process which comprises reacting α-benzamido-β-hydroxy-p-nitropropiophenone with sodium borohydride in a hydroxylic solvent selected from the class consisting of water, lower aliphatic alcohol and aqueous lower aliphatic alcohol at a temperature below 50° C. and hydrolyzing the boron complex so formed thereby obtaining a 1-p-nitrophenyl-2-benzamidopropane-1,3-diol compound of formula,

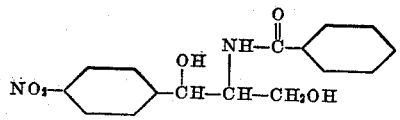

6. Process which comprises reacting α-dichloroacetamido-β-hydroxy - p - nitropropiophenone with potassium borohydride in a hydroxylic solvent selected from the class consisting of water, lower aliphatic alcohol and aqueous lower aliphatic alcohol at a temperature below 50° C. and hydrolyzing the boron complex so formed thereby obtaining a 1-p-nitrophenyl-2-dichloroacetamidopropane-1,3-diol compound of formula,

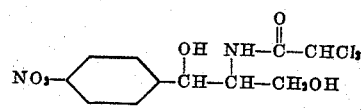

7. Process which comprises reacting α-acylamido-p-nitropropiophenone compound of formula,

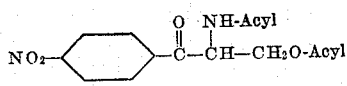

with a reducing agent of the class consisting of sodium borohydride and potassium borohydride in a hydroxylic solvent selected from the class consisting of water, lower aliphatic alcohol and aqueous lower aliphatic alcohol at a temperature below 50° C. and hydrolyzing the boron complex so formed thereby obtaining a 1-p-nitrophenyl-2-acylamidopropane-1,3-diol compound of formula,

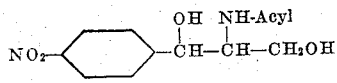

where Acyl is a carboxylic acid acyl group.

8. Process which comprises reacting α-dichloroacetamido-β-acetoxy-p-nitropropiophenone with sodium borohydride in a hydroxylic solvent selected from the class consisting of water, lower aliphatic alcohol and aqueous lower aliphatic alcohol at a temperature below 50° C. and hydrolyzing the boron complex so formed thereby obtaining a 1-p-nitrophenyl-2-dichloroacetamidopropane-1,3-diol compound of formula,

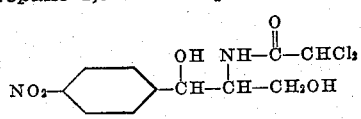

9. Process which comprises reacting α-acetamido-β-hydroxy-p-nitropropiophenone with sodium borohydride in ethanol at a temperature below 50° C., adding acid to precipitate insoluble boron salts, separating from the filtrate a solid product and separating by recrystallization a major amount of the (dl)-reg. isomer from a minor amount of the (dl)-pseudo isomer of 1-p-nitrophenyl-2-acetamidopropane-1,3-diol.

References Cited in the file of this patent

UNITED STATES PATENTS

| Number | Name | Date |
|---|---|---|
| 2,515,239 | Long | July 18, 1950 |
| 2,545,094 | Long et al. | May 13, 1951 |
| 2,562,107 | Long | July 24, 1951 |

OTHER REFERENCES

Nystrom et al.: "J. Am. Chem. Soc.," vol. 71 (1949), pp. 3245–6.